United States Patent
Wang et al.

(10) Patent No.: US 10,761,357 B2
(45) Date of Patent: Sep. 1, 2020

(54) LIQUID CRYSTAL DISPLAY PANEL AND DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Rui Wang, Beijing (CN); Shaoru Li, Beijing (CN); Xiaofeng Ma, Beijing (CN); Fei Shang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/308,927

(22) PCT Filed: Feb. 24, 2018

(86) PCT No.: PCT/CN2018/077158
§ 371 (c)(1),
(2) Date: Dec. 11, 2018

(87) PCT Pub. No.: WO2018/210025
PCT Pub. Date: Nov. 22, 2018

(65) Prior Publication Data
US 2019/0227370 A1    Jul. 25, 2019

(30) Foreign Application Priority Data
May 18, 2017 (CN) .......................... 2017 1 0351819

(51) Int. Cl.
G02F 1/1345    (2006.01)
G02F 1/1339    (2006.01)
G02F 1/1333    (2006.01)

(52) U.S. Cl.
CPC .... *G02F 1/133345* (2013.01); *G02F 1/13394* (2013.01); *G02F 1/13452* (2013.01)

(58) Field of Classification Search
CPC ........... G02F 1/133345; G02F 1/13394; G02F 1/13452; G02F 1/13458
See application file for complete search history.

(56) References Cited

U.S. PATENT DOCUMENTS 6,246,460 B1    6/2001   Young
2001/0050747 A1*  12/2001  Hoshino ........... G02F 1/133753
                                                        349/149

(Continued)

FOREIGN PATENT DOCUMENTS

CN      1729422 A     2/2006
CN    103472606 A    12/2013

OTHER PUBLICATIONS

PCT International Search Report for PCT Patent Application No. PCT/CN2018/077158 dated May 23, 2018. 4 Pages.

*Primary Examiner* — Angela K Davison
(74) *Attorney, Agent, or Firm* — Arent Fox LLP; Michael Fainberg

(57) ABSTRACT

A liquid crystal display panel and a display device, comprising: an array substrate, an opposite substrate arranged opposite to the array substrate, a driver circuit; a common electrode layer on a side of the opposite substrate facing the array substrate; and a liquid crystal layer located between the opposite substrate and the array substrate; the array substrate includes: a display area, a non-display area, a signal line in the display area, and a switchover terminal in the non-display area, where the switchover terminal (Continued)

includes: a first connection terminal electrically connected with the driver circuit, a second connection terminal electrically connected with the signal line, and an electrically-conductive layer covering the first connection terminal and the second connection terminal; the electrically-conductive layer is insulated from the common electrode layer.

13 Claims, 3 Drawing Sheets

(56) References Cited

U.S. PATENT DOCUMENTS

| | | | | |
|---|---|---|---|---|
| 2003/0179551 | A1* | 9/2003 | Sugimoto | H05K 3/361 361/748 |
| 2006/0244741 | A1* | 11/2006 | Kimura | G02F 1/13452 345/204 |

* cited by examiner

--Prior Art--

--Prior Art--

LIQUID CRYSTAL DISPLAY PANEL AND DISPLAY DEVICE

This application is a National Stage of International Application No. PCT/CN2018/077158, filed Feb. 24, 2018, which claims priority of Chinese Patent Application No. 201710351819.6, filed with the Chinese Patent Office on May 18, 2017, and entitled "A liquid crystal display panel and a display device", both of which are hereby incorporated by reference in their entireties.

FIELD

The present disclosure relates to the field of display technologies, and particularly to a liquid crystal display panel and a display device.

BACKGROUND

A Liquid Crystal Display (LCD) panel has been widely applied to a liquid crystal TV set, a mobile phone, a Personal Digital Assistant (PDA), a digital camera, a computer screen, a notebook screen, for example, due to a number of advantages thereof of a small thickness, energy saving, no radiation, etc.

SUMMARY

An embodiment of this disclosure provides a liquid crystal display panel including: an array substrate; an opposite substrate arranged opposite to the array substrate; a driver circuit; a common electrode layer on a side of the opposite substrate facing the array substrate; and a liquid crystal layer located between the opposite substrate and the array substrate, wherein the array substrate including: a display area; a non-display area; a signal line in the display area; and a switchover terminal in the non-display area, wherein the switchover terminal including: a first connection terminal electrically connected with the driver circuit; a second connection terminal electrically connected with the signal line; and an electrically-conductive layer covering the first connection terminal and the second connection terminal; wherein the electrically-conductive layer is insulated from the common electrode layer so that the electrically-conductive layer is not connected with the common electrode layer through micro-current.

In a possible implementation, in the liquid crystal display panel above according to the embodiment of this disclosure, an area of the common electrode layer corresponding to the electrically-conductive layer is a hollow area, and an orthographic projection of the hollow area onto the array substrate covers an orthographic projection of the electrically-conductive layer onto the array substrate.

In a possible implementation, in the liquid crystal display panel above according to the embodiment of this disclosure, an orthographic projection of the hollow area onto the array substrate covers an orthographic projection of the electrically-conductive layer onto the array substrate.

In a possible implementation, in the liquid crystal display panel above according to the embodiment of this disclosure, a distance between an edge of the orthographic projection of the hollow area onto the array substrate, and an edge of the orthographic projection of the electrically-conductive layer onto the array substrate is greater than 10 μm.

In a possible implementation, in the liquid crystal display panel above according to the embodiment of this disclosure, an insulation layer is arranged between the electrically-conductive layer and the common electrode layer, an orthographic projection of the insulation layer onto the array substrate covers the orthographic projection of the electrically-conductive layer onto the array substrate, and a resistivity of the insulation layer is higher than a resistivity of the liquid crystal layer.

In a possible implementation, in the liquid crystal display panel above according to the embodiment of this disclosure, the resistivity of the insulation layer is $10^{14}$ to $10^{15}$, and the resistivity of the liquid crystal layer is $10^{10}$ to $10^{12}$.

In a possible implementation, in the liquid crystal display panel above according to the embodiment of this disclosure, the liquid crystal display panel further includes spacers between the array substrate and the opposite substrate, wherein a material of the spacers is same as a material of the insulation layer.

In a possible implementation, in the liquid crystal display panel above according to the embodiment of this disclosure, an area of the orthographic projection of the insulation layer onto the array substrate covers an area of the orthographic projection of the electrically-conductive layer onto the array substrate.

In a possible implementation, in the liquid crystal display panel above according to the embodiment of this disclosure, a distance between an edge of the orthographic projection of the insulation layer onto the array substrate, and an edge of the orthographic projection of the electrically-conductive layer onto the array substrate is greater than 10 μm.

In a possible implementation, in the liquid crystal display panel above according to the embodiment of this disclosure, a material of the electrically-conductive layer is ITO.

In a possible implementation, the liquid crystal display panel above according to the embodiment of this disclosure further includes a pixel electrode layer in the display area, and the electrically-conductive layer and the pixel electrode layer are in a same layer.

In a possible implementation, in the liquid crystal display panel above according to the embodiment of this disclosure, the signal line is a data line, and the driver circuit is a data signal driver circuit.

In a possible implementation, in the liquid crystal display panel above according to the embodiment of this disclosure, the signal line is a gate line, and the driver circuit is a gate driver circuit.

An embodiment of this disclosure provides a display device including the liquid crystal display panel above according to the embodiment of this disclosure.

DETAILED DESCRIPTION OF THE EMBODIMENTS

Figure 1:
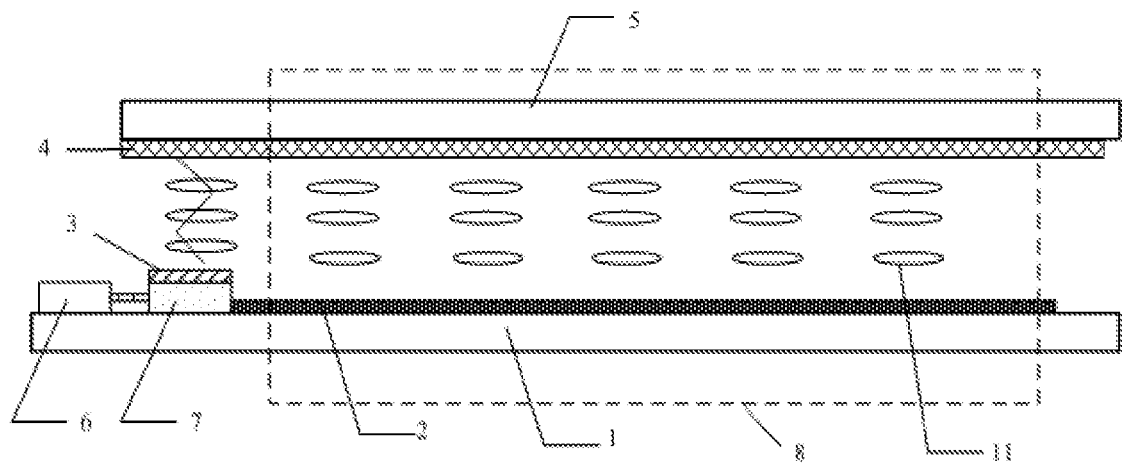
FIG. 1 is a first schematic structural diagram of a liquid crystal display panel in the related art.

In order to make the objects, technical solutions, and advantages of this disclosure more apparent, this disclosure will be described below in further details with reference to the drawings, and apparently the embodiments described below are only a part but not all of the embodiments of this disclosure. Based upon the embodiments here of this disclosure, all the other embodiments which can occur to those ordinarily skilled in the art without any inventive effort shall fall into the scope of this disclosure.

As used herein, the term "same layer" refers to the relationship between the layers simultaneously formed in the same step. The term "same layer" does not always mean that the thickness of the layer or the height of the layer in a cross-sectional view is the same.

The shapes and sizes of respective components in the drawings are not intended to reflect any real proportion, but only intended to illustrate the disclosure of this disclosure.

Particular implementations of the liquid crystal display panel and the display device according to the embodiments of this disclosure will be described below in details with reference to the drawings.

As illustrated in FIG. 1, the structure of the existing liquid crystal display panel in the related art generally includes a Thin Film Transistor (TFT) array substrate 1, an opposite substrate 5, a common electrode layer 4 located on the opposite substrate 5 side, and a liquid crystal layer 11 configured between the TFT and the opposite substrate, where pixel electrodes, data lines, and gate lines (not illustrated) are arranged on the array substrate 1, and driving voltage is applied to the pixel electrodes and the common electrode 4 to control liquid crystal molecules at the liquid crystal layer 11 to be rotated so that an image is displayed normally.

Figure 2:
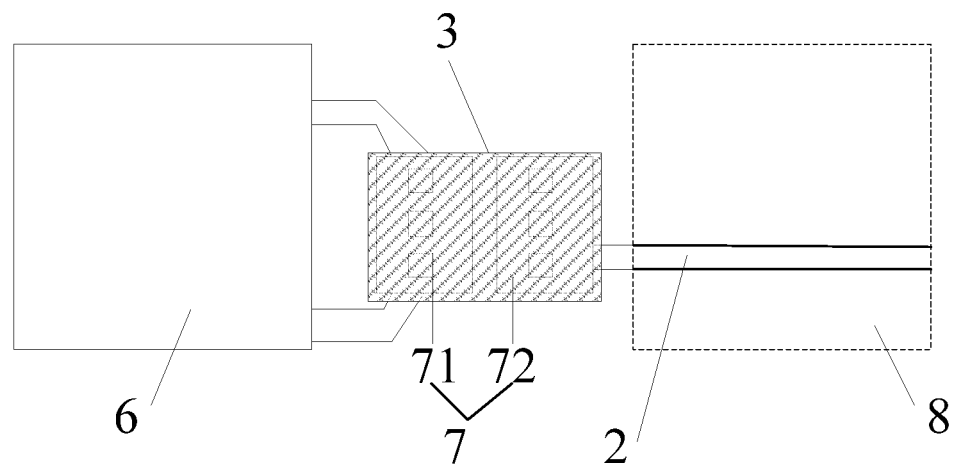
FIG. 2 is a second schematic structural diagram of a liquid crystal display panel in the related art.

In the related art, as illustrated in FIG. 1 and FIG. 2, a driver circuit 6 in a non-display area of the existing display panel is connected with a signal line 2 in a display area 8 through a switchover terminal 7, where the switchover terminal 7 includes a first connection terminal 71 and a second connection terminal 72, the first connection terminal 71 is electrically connected with the driver circuit 6, the second connection terminal 72 is electrically connected with the signal line 2, and an electrically-conductive layer 3 is arranged above the first connection terminal 71 and the second connection terminal 72, so that the driver circuit 6 is electrically connected with the signal line 2 to transmit a signal, thus displaying an image in the display area 8.

However in the existing display panel, the entire common electrode layer 4 covers the opposite substrate 5, and from the microscopic perspective, neither an alignment film nor liquid crystals are absolutely electrically-conductive, where the liquid crystals may be doped with ions, etc., so when there is a facing area between the common electrode layer 4, and the electrically-conductive layer 3 in the non-display area, and there is such a difference in voltage between the electrically-conductive layer 3 and the common electrode layer 4 while an image is being displayed micro-current may occur the liquid crystals between the common electrode layer 4 and the electrically-conductive layer 3 due to an electric field arising from the difference in voltage, the electrically-conductive layer 3 may be eroded under the long-term electrochemical action of the micro-current, and thus become poorly electrically-conductive or electrically-broken, and fail to transmit a signal, thus degrading the quality of displaying the image.

Accordingly it is highly desirable to avoid the electrically-conductive layer 3 from being electrochemically eroded.

Figure 3:
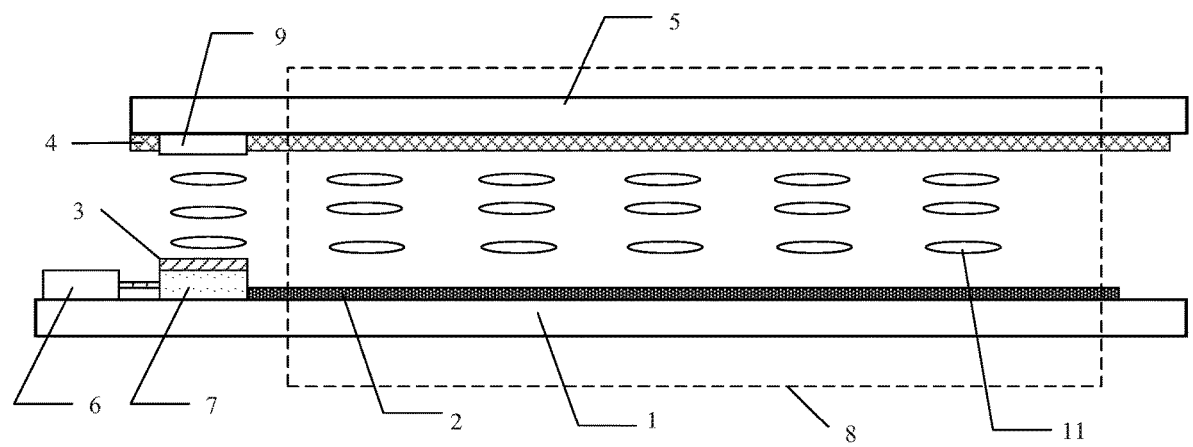
FIG. 3 is a first schematic structural diagram of a liquid crystal display panel according to an embodiment of this disclosure.
Figure 4:
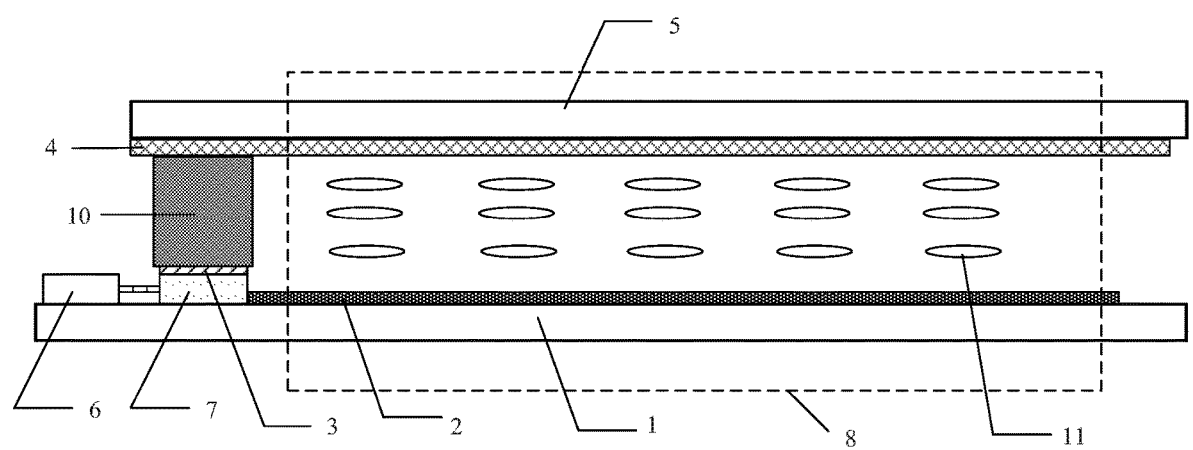
FIG. 4 is a second schematic structural diagram of the liquid crystal display panel according to the embodiment of this disclosure.

Hereupon an embodiment of this disclosure provides a liquid crystal display panel as illustrated in FIG. 2 to FIG. 4 including: an opposite substrate 5 and an array substrate 1 arranged opposite to each other, a driver circuit 6, and a liquid crystal layer 11 located between the opposite substrate 5 and the array substrate 1; the array substrate 1 includes a display area 8 and a non-display area, a signal line 2 is arranged in the display area 8, and a switchover terminal 7 is arranged in the non-display area to connect the driver circuit 6 with the signal line 2; a common electrode layer 4 is arranged on the side of the opposite substrate 5 facing the array substrate 1; and the switchover terminal 7 includes a first connection terminal 71 electrically connected with the driver circuit 6, a second connection terminal 72 electrically connected with the signal line 2, and an electrically-conductive layer 3 covering the first connection terminal 71 and the second connection terminal 72, and the electrically-conductive layer 3 is insulated from the common electrode layer 4 so that the electrically-conductive layer 3 cannot be connected with the common electrode layer 4 through micro-current.

Optionally, in the liquid crystal display panel above according to the embodiment of this disclosure, the common electrode layer 4 is insulated from the electrically-conductive layer 3 to thereby avoid micro-current from occurring through the liquid crystals between the common electrode layer 4 and the electrically-conductive layer 3, and thus electrochemically eroding the electrically-conductive layer 3, so as to protect the electrically-conductive layer 3, and to prevent the signal line 2 from being disconnected from the driver circuit 6, which would otherwise hinder a signal from being transmitted, thus improving the quality of displaying an image.

Optionally, in the liquid crystal display panel above according to the embodiment of this disclosure, as illustrated in FIG. 2, both the first connection terminal 71 and the second connection terminal 72 generally include a plurality of switchover through-holes to be connected respectively with the driver circuit 6 and the signal line 2. In a real application, the number of switchover through-holes can be selected as needed in reality, and the electrically-conductive layer 3 overlying the switchover terminal 7 is configured to connect the first connection terminal 71 with the second connection terminal 72, that is, the driver circuit 6 is connected with the signal line 2 through the electrically-conductive layer 3 so that the driver circuit 6 transmits a signal to the signal line 2 to display an image on the liquid crystal display panel.

Optionally, in the liquid crystal display panel above according to the embodiment of this disclosure, in order to insulate the electrically-conductive layer 3 from the common electrode layer 4, as illustrated in FIG. 3, the area of the common electrode layer 4 corresponding to the electrically-conductive layer 3 can be a hollow area 9, and an orthographic projection of the hollow area 9 onto the array substrate 1 can cover an orthographic projection of the electrically-conductive layer 3 onto the array substrate 1.

Optionally, in the liquid crystal display panel above according to the embodiment of this disclosure, when the orthographic projection of the hollow area 9 onto the array substrate 1 covers the orthographic projection of the electrically-conductive layer 3 onto the array substrate 1, the orthographic projection of the hollow area 9 onto the array substrate 1 can be equal to the orthographic projection of the electrically-conductive layer 3 onto the array substrate 1, that is, the two orthographic projections overlap with each other, or the orthographic projection of the hollow area 9 onto the array substrate 1 can cover the orthographic projection of the electrically-conductive layer 3 onto the array substrate 1.

Optionally, in order not to connect the electrically-conductive layer 3 with the common electrode layer 4 through micro-current, the area of the common electrode layer 4 corresponding to the electrically-conductive layer 3 is arranged as the hollow area 9 so that there is no facing area between the common electrode layer 4 and the electrically-conductive layer 3, so even if there is a difference in voltage between the signal line 2 and the common electrode layer 4, then no electric field will be formed between the common electrode layer 4 and the electrically-conductive layer 3, so no micro-current will occur between them through the liquid crystals, and thus the electrically-conductive layer 3 can be avoided from being electrochemically eroded by micro-current occurring through the liquid crystals due to the difference in voltage between the common electrode layer 4 and the signal line 2, thus avoiding a short circuit or electric disconnection from occurring.

Optionally, in the liquid crystal display panel above according to the embodiment of this disclosure, the area of the orthographic projection of the hollow area 9 onto the array substrate 1 covers the area of the orthographic projection of the electrically-conductive layer 3 onto the array substrate 1.

Optionally, the area of the orthographic projection of the hollow area 9 onto the array substrate 1 covers the area of the orthographic projection of the electrically-conductive layer 3 onto the array substrate 1 so that the edge of the electrically-conductive layer 3 will not be electrochemically eroded due to an electric field occurring between the area around the electrically-conductive layer 3, and the common electrode layer 4.

Optionally, in the liquid crystal display panel above according to the embodiment of this disclosure, the distance between the edge of the orthographic projection of the hollow area 9 onto the array substrate 1, and the edge of the orthographic projection of the electrically-conductive layer 3 onto the array substrate 1 is greater than 10 µm. It shall be noted that the edges compared here are the edges of the orthographic projections of the hollow area 9 and the electrically-conductive layer 3 on the same side, i.e., their adjacent edges.

Optionally, when the distance between the edge of the orthographic projection of the hollow area 9 onto the array substrate 1, and the edge of the orthographic projection of the electrically-conductive layer 3 onto the array substrate 1 is greater than 10 µm, the edge of the electrically-conductive layer 3 can be further avoided from being electrochemically eroded by micro-current occurring through the liquid crystals due to an electric field occurring between the signal line 2 in the area around the electrically-conductive layer 3, and the common electrode layer 4.

Instead of the hollow area 9 arranged in the area of the common electrode layer 4 corresponding to the electrically-conductive layer 3, optionally in the liquid crystal display panel above according to the embodiment of this disclosure, an insulation layer 10 can be arranged between the electrically-conductive layer 3 and the common electrode layer 4, where a orthographic projection of the insulation layer 10 onto the array substrate 1 covers the orthographic projection of the electrically-conductive layer 3 onto the array substrate 1, as illustrated in FIG. 4. It shall be noted that the insulation performance of the insulation layer 10 is higher than the insulation performance of the liquid crystal layer and the alignment layer, that is, the resistivity of the insulation layer 10 is higher than the resistivity of the liquid crystal layer. For example, the insulation layer 10 can be made of a material of a spacer configured to support the array substrate and the opposite substrate to be aligned. The resistivity of the liquid crystal layer is approximately $10^{12}$, and may drop to approximately $10^{10}$ to $10^{11}$ under a high-temperature and humidity condition where water and vapor may intrude. The resistivity of the spacer material is generally approximately $10^{14}$ to $10^{15}$.

Optionally, when the orthographic projection of the insulation layer 10 onto the array substrate 1 covers the orthographic projection of the electrically-conductive layer 3 onto the array substrate 1, the orthographic projection of the insulation layer 10 onto the array substrate 1 can be equal to the orthographic projection of the electrically-conductive layer 3 onto the array substrate 1, that is, the two orthographic projection overlap, or the orthographic projection of the insulation layer 10 onto the array substrate 1 can cover orthographic projection of the electrically-conductive layer 3 onto the array substrate 1.

Optionally, the insulation layer 10 is arranged between the common electrode layer 4 and the electrically-conductive layer 3, so although there is still such a facing area between the common electrode layer 4 and the electrically-conductive layer 3 that an electric field may also occur between them, the insulation layer 10 is arranged between the common electrode layer 4 and the electrically-conductive layer 3 so that there are no liquid crystals between the common electrode layer 4 and the electrically-conductive layer 3, and thus the electrically-conductive layer 3 can be avoided from being electrochemically eroded by micro-current occurring through liquid crystals, despite the electric field.

Optionally, the insulation layer 10 arranged between the common electrode layer 4 and the electrically-conductive layer 3 can be formed in the same patterning process as spacers in the display area 8 (not illustrated) to thereby simplify the process flow, and save the production cost.

Optionally, in the liquid crystal display panel above according to the embodiment of this disclosure, the area of the orthographic projection of the insulation layer onto the array substrate covers the area of the orthographic projection of the electrically-conductive layer onto the array substrate.

Optionally, the area of the orthographic projection of the insulation layer 10 onto the array substrate 1 covers the area of the orthographic projection of the electrically-conductive layer 3 onto the array substrate 1 so that the edge of the electrically-conductive layer 3 will not be electrochemically eroded due to an electric field occurring between the area around the electrically-conductive layer 3, and the common electrode layer 4.

Optionally, in the liquid crystal display panel above according to the embodiment of this disclosure, the distance between the edge of the orthographic projection of the insulation layer 10 onto the array substrate 1, and the edge of the orthographic projection of the electrically-conductive layer 3 onto the array substrate 1 is greater than 10 µm. It shall be noted that the edges compared here are the edges of the orthographic projections of the insulation layer 10 and the electrically-conductive layer 3 on the same side, i.e., their adjacent edges.

Optionally, when the distance between the edge of the orthographic projection of the insulation layer 10 onto the array substrate 1, and the edge of the orthographic projection of the electrically-conductive layer 3 onto the array substrate 1 is greater than 10 µm, the edge of the electrically-conductive layer 3 can be further avoided from being electrochemically eroded by micro-current occurring through the liquid crystals due to an electric field occurring between the signal line 2 in the area around the electrically-conductive layer 3, and the common electrode layer 4.

Figure 5:
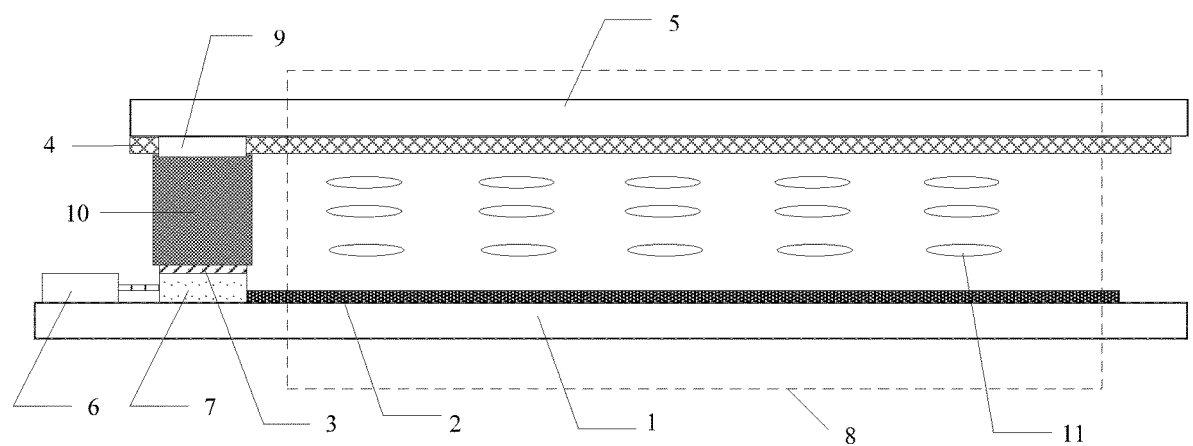
FIG. 5 is a third schematic structural diagram of the liquid crystal display panel according to the embodiment of this disclosure.

Optionally, in the liquid crystal display panel above according to the embodiment of this disclosure, as illustrated in FIG. 5, the hollow area 9 is arranged in the area of the common electrode layer 4 corresponding to the electrically-conductive layer 3, but also the insulation layer 10 is arranged between the electrically-conductive layer 3 and the common electrode layer 4, so that the electrically-conductive layer 3 can be avoided from being electrochemically eroded; or as illustrated in FIG. 3, only the hollow area 9 is arranged in the area of the common electrode layer 4 corresponding to the electrically-conductive layer 3, so that the electrically-conductive layer 3 can be avoided from being electrochemically eroded; or as illustrated in FIG. 4, only the insulation layer 10 is arranged between the electrically-conductive layer 3 and the common electrode layer 4, so that the electrically-conductive layer 3 can be avoided from being electrochemically eroded, although the embodiment of this disclosure will not be limited thereto.

Optionally, in the liquid crystal display panel above according to the embodiment of this disclosure, the material of the electrically-conductive layer 3 is generally ITO. Of course, the electrically-conductive layer 3 can alternatively be made of another electrically-conductive material, e.g., IZO, metal, etc., although the embodiment of this disclosure will not be limited thereto.

Optionally, in order to reduce the steps in the fabrication process, in the liquid crystal display panel above according to the embodiment of this disclosure, a pixel electrode layer is further arranged in the display area, and the electrically-conductive layer 3 and the pixel electrode layer are in a same layer. In this way, the pixel electrode layer and the electrically-conductive layer 3 can be formed in the same patterning process to thereby simplify the process flow, and save the production cost.

Optionally, in the liquid crystal display panel above according to the embodiment of this disclosure, the signal line 2 can include a gate line, a data line, or any other functionally-similar signal line applicable to the scenario above.

Optionally, in the liquid crystal display panel above according to the embodiment of this disclosure, the driver circuit 6 in use varies with the different signal line 2, so the driver circuit 6 can be adapted to the signal line 2 in a real application.

Optionally, in the liquid crystal display panel above according to the embodiment of this disclosure, the signal line 2 can be a data line, and accordingly the driver circuit 6 can be a data signal driver circuit.

Optionally, in the liquid crystal display panel above according to the embodiment of this disclosure, the signal line 2 can be a gate line, and accordingly the driver circuit 6 can be a gate driver circuit.

Based upon the same inventive idea, an embodiment of this disclosure further provides a display device including the liquid crystal display panel according to any one of the embodiments above of this disclosure. The display device can be a mobile phone, a tablet computer, a TV set, a monitor, a notebook computer, a digital photo frame, a navigator, or any other product or component with a display function. Reference can be made to the embodiment of the liquid crystal display panel above for an implementation of the display device, and a repeated description thereof will be omitted here.

In the liquid crystal display panel and the display device above according to the embodiments of this disclosure, the liquid crystal display panel includes: an opposite substrate and an array substrate arranged opposite to each other, a driver circuit, and liquid crystals located between the opposite substrate and the array substrate; the array substrate includes a display area and a non-display area, a signal line is arranged in the display area, and a switchover terminal is arranged in the non-display area to connect the driver circuit with the signal line; a common electrode layer is arranged on the side of the opposite substrate facing the array substrate; and the switchover terminal includes a first connection terminal electrically connected with the driver circuit, a second connection terminal electrically connected with the signal line, and an electrically-conductive layer covering the first connection terminal and the second connection terminal, and the electrically-conductive layer is insulated from the common electrode layer. The common electrode layer is insulated from the electrically-conductive layer so that the electrically-conductive layer can be avoided from being connected with the common electrode layer through micro-current, to thereby avoid micro-current from occurring through the liquid crystals between the electrically-conductive layer and the common electrode layer, and thus electrochemically eroding the electrically-conductive layer, so as to protect the electrically-conductive layer, and to prevent the signal line from being disconnected from the driver circuit, which would otherwise hinder a signal from being transmitted, thus improving the quality of displaying an image.

Evidently those skilled in the art can make various modifications and variations to the disclosure without departing from the spirit and scope of this disclosure. Thus the disclosure is also intended to encompass these modifications and variations thereto so long as the modifications and variations come into the scope of the claims appended to the disclosure and their equivalents.

The invention claimed is:

1. A liquid crystal display panel, comprising:
an array substrate;
an opposite substrate arranged opposite to the array substrate;
a driver circuit;
a common electrode layer on a side of the opposite substrate facing the array substrate; and
a liquid crystal layer located between the opposite substrate and the array substrate, wherein
the array substrate further comprising:
a display area;
a non-display area;
a signal line in the display area; and
a switchover terminal in the non-display area to connect the driver circuit with the signal line, wherein the switchover terminal comprising:
a first connection terminal electrically connected with the driver circuit;
a second connection terminal electrically connected with the signal line; and
an electrically-conductive layer covering the first connection terminal and the second connection terminal, wherein
the electrically-conductive layer is insulated from the common electrode layer;
wherein an insulation layer is between the electrically-conductive layer and the common electrode layer, an orthographic projection of the insulation layer onto the array substrate covers an orthographic projection of the electrically-conductive layer onto the array substrate, and a resistivity of the insulation layer is higher than a resistivity of the liquid crystal layer.

2. The liquid crystal display panel according to claim 1, wherein a material of the electrically-conductive layer is ITO.

3. The liquid crystal display panel according to claim 1, further comprising a pixel electrode layer in the display area, and the electrically-conductive layer and the pixel electrode layer are in a same layer.

4. The liquid crystal display panel according to claim 1, wherein the signal line is a data line, and the driver circuit is a data signal driver circuit.

5. The liquid crystal display panel according to claim 1, wherein the signal line is a gate line, and the driver circuit is a gate driver circuit.

6. A display device, comprising the liquid crystal display panel according to claim 1.

7. The liquid crystal display panel according to claim 1, wherein the resistivity of the insulation layer is $10^{14}$ ohms per centimeter to $10^{15}$ ohms per centimeter, and the resistivity of the liquid crystal layer is $10^{10}$ ohms per centimeter to $10^{12}$ ohms per centimeter.

8. The liquid crystal display panel according to claim 6, further comprises spacers between the array substrate and the opposite substrate, wherein a material of the spacers and a material of the insulation layer are a same material.

9. The liquid crystal display panel according to claim 1, wherein an area of the orthographic projection of the insulation layer onto the array substrate covers an area of the orthographic projection of the electrically-conductive layer onto the array substrate.

10. The liquid crystal display panel according to claim 9, wherein a distance between an edge of the orthographic projection of the insulation layer onto the array substrate, and an edge of the orthographic projection of the electrically-conductive layer onto the array substrate is greater than 10 μm.

11. The liquid crystal display panel according to claim 1, wherein an area of the common electrode layer corresponding to the electrically-conductive layer is a hollow area, and an orthographic projection of the hollow area onto the array substrate covers an orthographic projection of the electrically-conductive layer onto the array substrate.

12. The liquid crystal display panel according to claim 11, wherein the orthographic projection of the hollow area onto the array substrate covers the orthographic projection of the electrically-conductive layer onto the array substrate.

13. The liquid crystal display panel according to claim 12, wherein a distance between an edge of the orthographic projection of the hollow area onto the array substrate, and an edge of the orthographic projection of the electrically-conductive layer onto the array substrate is greater than 10 μm.

* * * * *